US012620931B2

(12) United States Patent
Nicolaedis et al.

(10) Patent No.: US 12,620,931 B2
(45) Date of Patent: May 5, 2026

(54) CLAMPING MECHANISM FOR GROUNDING PHOTOVOLTAIC MODULE(S)

(71) Applicant: Unirac, Inc., Albuquerque, NM (US)

(72) Inventors: Klaus Nicolaedis, Albuquerque, NM (US); Todd Ganshaw, Albuquerque, NM (US)

(73) Assignee: Unirac, Inc., Albuquerque, NM (US)

( * ) Notice: Subject to any disclaimer, the term of this patent is extended or adjusted under 35 U.S.C. 154(b) by 0 days.

(21) Appl. No.: 18/139,502

(22) Filed: Apr. 26, 2023

(65) Prior Publication Data

US 2024/0364258 A1    Oct. 31, 2024

(51) Int. Cl.
| | |
|---|---|
| *H02S 40/30* | (2014.01) |
| *F16B 2/06* | (2006.01) |
| *H02S 20/20* | (2014.01) |

(52) U.S. Cl.
CPC .............. *H02S 40/30* (2014.12); *F16B 2/065* (2013.01); *H02S 20/20* (2014.12)

(58) Field of Classification Search
CPC .. H02S 20/23; F16B 2/065; F16B 2/12; F16B 7/18; F16B 7/187; F16B 43/00; F24S 25/30; F24S 25/33; F24S 25/40; F24S 25/634; F24S 25/636; F24S 25/65; F24S 2025/6003; F24S 2025/6006; F24S 2025/801; F24S 2025/803; F24S 2025/807
See application file for complete search history.

(56) References Cited

U.S. PATENT DOCUMENTS

| | | | | |
|---|---|---|---|---|
| 2015/0311606 A1* | 10/2015 | Meine | ................. | H01R 13/648 |
| | | | | 439/100 |
| 2017/0085219 A1* | 3/2017 | Ash | .......................... | H02S 30/00 |
| 2019/0326847 A1 | 10/2019 | Zuritis | | |
| 2022/0060143 A1 | 2/2022 | Neal et al. | | |
| 2022/0345074 A1 | 10/2022 | Neal et al. | | |
| 2023/0396208 A1* | 12/2023 | Pedlar | ..................... | F24S 25/33 |

FOREIGN PATENT DOCUMENTS

| | | |
|---|---|---|
| WO | WO2023028101 A1 | 3/2023 |

OTHER PUBLICATIONS

Search Report and Written Opinion for International Application No. PCT/US 24/20091, Dated Jul. 11, 2024, 14 pages.

* cited by examiner

*Primary Examiner* — Mayla Gonzalez Ramos
(74) *Attorney, Agent, or Firm* — Lee & Hayes, P.C.

(57) ABSTRACT

A clamping mechanism includes a first fastener and a second fastener. The second fastener includes a head having a first rib with a first serration, a second rib with a second serration, a third rib with a third serration, and a fourth rib with a fourth serration. The first rib extends a first length and the first serration extends a second length that is less than the first length. The second rib extends a third length and the second serration extends a fourth length that is less than the third length. The third rib extends a fifth length and the third serration extends a sixth length that is less than the fifth length. The fourth rib extends a seventh length and the fourth serration extends an eighth length that is less than the seventh length. The second fastener includes a body coupled to the first fastener.

20 Claims, 14 Drawing Sheets

100

A

102

104

112

110

114

106

108

A

100

200

212

102

202

204

104

206

210

106

110

208

108

Y
Z

106

210

402

110

410

404

416(1)
114(1)

400

408

416(2)
114(2)

412

108

414(1)
112(1)

208

414(2)
112(2)

406

106

410

408

908

900

110

910

902

416(1)     114(1)     112(1)     414(1)

108

106

410

408

912

904

110

914

906

416(2)     114(2)          112(2)     414(2)

108

100

1006

1000

1002

108

1008

1004

100

1106

1100

1104

1108

1102

CLAMPING MECHANISM FOR GROUNDING PHOTOVOLTAIC MODULE(S)

BACKGROUND

The solar industry is growing world-wide and, as a result, more-efficient structures are desirable for mounting photovoltaic modules or solar panel modules to a structure, such as a roof of a home or other building. Unfortunately, because solar panel modules have not been standardized, a size (e.g., thickness) of the solar panel modules may vary depending on the manufacturer. As such, racks, rails, or other mounting systems are customized according to the size of the solar panel modules. However, in order to comply with codes and/or other regulations (e.g., National Electric Code NEC)), the mounting systems may need to be bonded and/or grounded. However, because the thickness of the solar panels may vary depending on the manufacture, bonding and/or grounding the solar panel modules remains a challenge. In such instances, the mounting systems may fail to electrically bond or ground the solar panel modules, and/or the installation may be difficult and/or time consuming.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The components, devices, and/or apparatuses depicted in the accompanying figures are not to scale and components within the figures may be depicted not to scale with each other.

DETAILED DESCRIPTION

Figure 1:
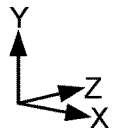
FIG. 1 illustrates a perspective view of an example clamping mechanism for use with a photovoltaic module, according to embodiments of the present disclosure.

This application is directed, at least in part, to a clamping mechanism that attaches to a rail, bracket, and/or other mounting equipment of a photovoltaic module, and which electrically bonds the photovoltaic module to the mounting equipment. In some embodiments, the mounting equipment may be disposed on a surface (e.g., roof, etc.) to which the photovoltaic module is disposed. For example, rails may be mounted to the structure, and thereafter, the photovoltaic module may be mounted to the rails. The clamping mechanism may serve to couple the photovoltaic module to the rails, as well as electrically bond the photovoltaic module to the rails, for example, when the clamping mechanism is tightened. In some embodiments, portions of the clamping mechanism include ribs that increase a clamping force of the clamping mechanism to the rail. Additionally, the clamping mechanism may include serrations that locally deform a portion of the rail in contact with the clamping mechanism to increase electrical bonding. For example, the serrations may puncture an anodized, a galvanized, and/or a painted layer of the rail to electrically bond with the rail. As such, the clamping mechanism may include ribs for providing a sufficient clamping force for coupling the photovoltaic module to the rail, as well as serrations that ensure proper electrical bonding.

In some embodiments, the clamping mechanism includes a first fastener, a second fastener, and a third fastener that couple together. The first fastener and the third fastener may couple to, or be secured in, the second fastener. For example, the first fastener may include a first end and a second end, opposite the first end, that is coupled to the second fastener. The second fastener may include a first end that receives the second end of the first fastener. Additionally, the third fastener may include a first end and a second end, opposite the second end, that is coupled to the second fastener. In some embodiments, the third fastener couples to a second end of the second fastener, opposite the first end of the second fastener that receives the first fastener. In some embodiments, the second fastener may represent a nut into which the first fastener and/or the third fastener are threaded. For example, the second end of the first fastener may thread into the first end of the second fastener, and the second end of the third fastener may thread into the second end of the second fastener. In some embodiments, however, the third fastener may be press-fit, crimped, or otherwise secured within the second fastener.

The first fastener is configured to extend various lengths from the second fastener. For example, to accommodate different thicknesses of photovoltaic modules coupled to the rail, the first fastener may be disposed at various lengths from the second fastener. In this instance, a spacing between the first end of the first fastener and the first end of the second fastener, or an amount that the first fastener is threaded into the second fastener, may be based on a thickness of the photovoltaic module. The second fastener may include a length (e.g., elongated nut, extension nut, coupler nut, etc.) for accommodating different amounts that the first fastener is threaded into the second fastener.

The first end of the third fastener is configured to be disposed within a channel of the rail. The first end (e.g., head) may be disposed within the channel of the rail to provide a clamping force (e.g., anchor) in order to secure the photovoltaic module to the rail. For example, as the first fastener is tightened into the second fastener, the second fastener may exert a force on (e.g., pull) the third fastener. This pulling nature urges the first end of the third fastener into contact with the rail (e.g., a surface within the channel) to clamp the photovoltaic module to the rail. In other words, during tightening of the clamping mechanism, the photovoltaic module becomes clamped to the rail (e.g., between the rail and the first end of the first fastener).

As introduced above, the clamping mechanism may include ribs that serve to increase a clamping force with the rail and/or which electrically bonds the photovoltaic module to the rail. In some embodiments, the ribs are disposed on the first end of the third fastener. The ribs may represent grooves, notches, protrusions, and so forth. The ribs may also take a plurality of shapes, such as being triangular shaped, half-circular shaped, square-shaped, hexagonally-shaped, and so forth. During a tightening of the clamping mechanism, the ribs may engage with the rail, within the channel, and effectuate to increase the clamping force by which the clamping mechanism is secured to the rail. For example, the ribs may concentrate the clamping force in order to increase an electrical bond between the clamping mechanism and the rail.

In some embodiments, the first fastener may include any number of ribs (e.g., two, three, four, six, etc.). In some embodiments, the ribs may extend across the first end of the third fastener in a first direction (e.g., length), and may be spaced apart across from one another in a second direction (e.g., width). For example, the first end of the third fastener may have a quadrilateral shape (e.g., rectangle, parallelogram, etc.), and the ribs may span a lengthwise direction at the first end of the third fastener. In some embodiments, the ribs may be separated by a body of the third fastener that couples the third fastener to the second fastener. For example, the body may extend from the first end of the third fastener (e.g., from the head), to the second end of the third fastener (and into the second fastener). In some embodiments, the body of the third fastener may be disposed between first ribs on a first side and second ribs on a second side. In some embodiments, the third fastener may include two of the first ribs, and two of the second ribs. In some embodiments, the use of two of the first ribs and/or two of the second ribs, as compared to three, four, etc., may concentrate the clamping force when the clamping mechanism to the rail. In some embodiments, the first ribs may be different than, or the same as, the second ribs (e.g., shape, size, number, etc.).

In addition to including the ribs, the third fastener may include the serrations. In some embodiments, the serrations may be disposed on, or extend from, the ribs. For example, the serrations may extend from, or be integral with, the ribs. The serrations may represent any suitable feature for locally deforming the rail to electrically bond the clamping mechanism to the rail. By way of example, the serrations may represent projections, grooves, teeth, spikes, upturned features, notches, and so forth that pierce, scar, dig into, shear, or otherwise engage with the rail. In some embodiments, the serrations may be disposed on an end of the ribs, respectively, for engaging with the interior surface of the channel on the rail. For example, the serrations may be disposed on an end of the ribs, spaced apart from the body (e.g., at a perimeter of the first end of the third fastener, at an outer or radially distant point from a central axis of the third fastener). Any number of serrations may be included (e.g., one, two, three, etc.) on the ribs, respectively.

During tightening of the clamping mechanism, the serrations may shear the interior surface of the rail, within the channel, causing removal of anodization for electrical bonding. However, the serrations may be configured to pierce a galvanized layer, a painted layer, etc. of the rail for electrically bonding the clamping mechanism to the rail. The use of the serrations may eliminate the use of copper wire and/or grounding straps or bonding jumpers to ground the photovoltaic modules.

Although the clamping mechanism is described as including three fasteners that couple together (i.e., the first fastener, the second fastener, and the third fastener), the clamping mechanism may include more than or less than three fasteners. For example, in some embodiments, the second fastener and the third fastener may be integral with one another (e.g., a unitary structure), such that the second fastener receives the first fastener (e.g., at a first end) and includes the ribs and/or serrations that engage with the rail (e.g., at a second end). Additionally, the clamping mechanism may be used in conjunction with other clamps, attachment mechanisms, brackets, etc. that effectuate to couple the photovoltaic modules to the rail (or more generally, a surface, structure, etc.). For example, the clamping mechanism may be used in conjunction with a bracket of the photovoltaic module, where clamping mechanism may be engaged with the bracket for securing the photovoltaic module to the rail.

Further, while the discussion herein relates to electrically bonding photovoltaic modules, the clamping mechanism may be used to electrically bond other assemblies, components, or devices other than photovoltaic modules. Further, while the discussion herein relates to electrically bonding the photovoltaic module to the rail, the clamping mechanism may be used to electrically bond the photovoltaic to other supports, brackets, frames, etc.

As used herein, the term "electrical bond," "electrically bonding," "bonding," or "grounding," includes any act of joining electrical conductors together. For example, the term "electrical bond," "electrically bonding," "bonding," or "grounding," includes the practice of intentionally electrically connecting metallic items together. The electrical bonding may be conducted in accordance with the National Electric Code (NEC).

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example clamping mechanism 100 configured clamp a photovoltaic module to a rail, for example, and to electrically bond the photovoltaic module to the rail, according to examples of the present disclosure. In some embodiments, the clamping mechanism 100 includes a first fastener 102 (e.g., bolt), a second fastener 104 (e.g., nut), and/or a third fastener 106 (e.g., "T-shaped" bolt). As will be explained herein, the first fastener 102 and the third fastener 106 may be coupled to the second fastener 104. For example, the first fastener 102 and/or the third fastener 106 may be threaded into the second fastener 104. However, in some embodiments, the first fastener 102 may be threaded into the second fastener 104, while the third fastener 106 may be otherwise secured to the second fastener 104 (e.g., press-fit, crimped, etc.). In some embodiments, the third fastener 106 may be rotatably coupled to the second fastener 104, or may be fixedly coupled to the second fastener 104.

The first fastener 102 is configured to extend various lengths from the second fastener 104. For example, to accommodate different thicknesses of photovoltaic modules coupled to the rail, the first fastener 102 may be disposed at various lengths from the second fastener 104. The second fastener 104 may include a length (e.g., in the Y-direction) for accommodating different amounts that the first fastener 102 is threaded into the second fastener 104.

A portion of the third fastener 106, such as a head 108 of the third fastener 106, is configured to reside within a channel of the rail in order to provide a clamping force (e.g., anchor) to secure the photovoltaic module to the rail. For example, during tightening of the clamping mechanism 100 (e.g., via rotation of the first fastener 102), the photovoltaic module may be clamped between the first fastener 102 and the rail. In other words, as the first fastener 102 is tightened, the second fastener 104 may impart a pulling force to the third fastener 106 (e.g., in the Y-direction). However, being as the head 108 of the third fastener 106 is secured within the rail, the photovoltaic module may become clamped to the rail during a tightening of the first fastener 102.

The third fastener 106 may include ribs that serve to increase a clamping force between the clamping mechanism 100 and the rail and/or which electrically bonds the photovoltaic module to the rail. The ribs may represent grooves, notches, protrusions, and so forth disposed on the head 108 of the third fastener 106. As will be explained herein, the ribs may also take a plurality of shapes, such as being triangular shaped, half-circular shaped, square-shaped, hexagonally-shaped, and so forth. During a tightening of the clamping mechanism 100, the ribs may engage with the rail to increase the clamping force by which the clamping mechanism 100 is secured to the rail. For example, the ribs may concentrate the clamping force in order to increase an electrical bond between the clamping mechanism 100 and the rail.

In some embodiments, the third fastener 106 may include any number of ribs (e.g., two, three, four, six, etc.). In some embodiments, the ribs may be separated by a body 110 of the third fastener 106 that couples the third fastener 106 to the second fastener 104. For example, the body 110 may extend from the head 108, and may be received within the second fastener 104 (e.g., the third fastener 106 couples to the second fastener 104 via the body 110). In some embodiments, the body 110 of the third fastener 106 is disposed between first ribs 112 and second ribs 114. For example, the first ribs 112 may be disposed on a first side of the body 110, while the second ribs 114 may be disposed on a second side of the body 110. In some embodiments, the third fastener 106 may include two of the first ribs 112, and two of the second ribs 114. In an embodiments, the use of two of the first ribs 112 and/or two of the second ribs 114, as compared to three, four, etc., may concentrate the clamping force when the clamping mechanism 100 is secured to the rail. In some embodiments, the first ribs 112 may be different than, or the same as, the second ribs 114 (e.g., shape, size, number, etc.).

Moreover, as will be explained herein, the third fastener 106 may include serrations that further increase an electrical bond between the clamping mechanism 100 and the rail. In some embodiments, the serrations may be disposed on ends of the first ribs 112 and/or the second ribs 114, respectively, spaced apart from the body 110 (e.g., in the X-direction).

Figure 2:
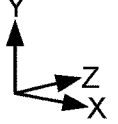
FIG. 2 illustrates an exploded view of the clamping mechanism of FIG. 1, showing a first fastener, a second fastener, and a third fastener of the clamping mechanism, according to embodiments of the present disclosure.

FIG. 2 illustrates an exploded view of the clamping mechanism 100, according to examples of the present disclosure. As introduced above in FIG. 1, the first fastener 102 and the third fastener 106 may couple to, or be secured in, the second fastener 104. For example, the first fastener 102 may include a first end 200 and a second end 202, opposite the first end 200 (e.g., in the Y-direction), that couples to the second fastener 104. The second fastener 104 may include a first end 204 that receives the second end 202 of the first fastener 102, and a second end 206 opposite the first end 204. Additionally, the third fastener 106 may include a first end 208 and a second end 210, opposite the first end 208 (e.g., in the Y-direction), that couples to the second fastener 104.

In some embodiments, the second fastener 104 may represent a nut (e.g., elongated nut, extension nut, coupler nut, etc.) for accommodating different amounts that the first fastener 102 is threaded into the second fastener 104. For example, the second fastener 104 may include a length between the first end 204 and the second end 206 (e.g., in the Y-direction) for accommodating different amounts of the first fastener 102. As such, the second end 202 of the first fastener 102 may thread into the first end 204 of the second fastener 104, and/or the second end 210 of the third fastener 106 may thread into the second end 206 of the second fastener 104. In some embodiments, however, the third fastener 106 may be press-fit, crimped, or otherwise secured within the second fastener 104. For example, at least a portion of the body 110 may be secured to the second fastener 104. In some embodiments, the second end 210 of the third fastener 106 (or the body 110) may include features for engaging with the second fastener 104 (e.g., tang, lip, flange, etc.). The body 110 may also include different cross-sectional dimensions (e.g., in the X and/or Z direction).

The head 108 of the third fastener 106, meanwhile, may be disposed at the first end 208 of third fastener 106. The first fastener 102 may additionally include a head 212 that secures to the photovoltaic module, or a bracket of the photovoltaic module, for coupling the photovoltaic module to the rail. The head 212 is configured to be tightened (e.g., via tools, socket, driver, etc.) for clamping the photovoltaic module to the rail.

Figure 3:
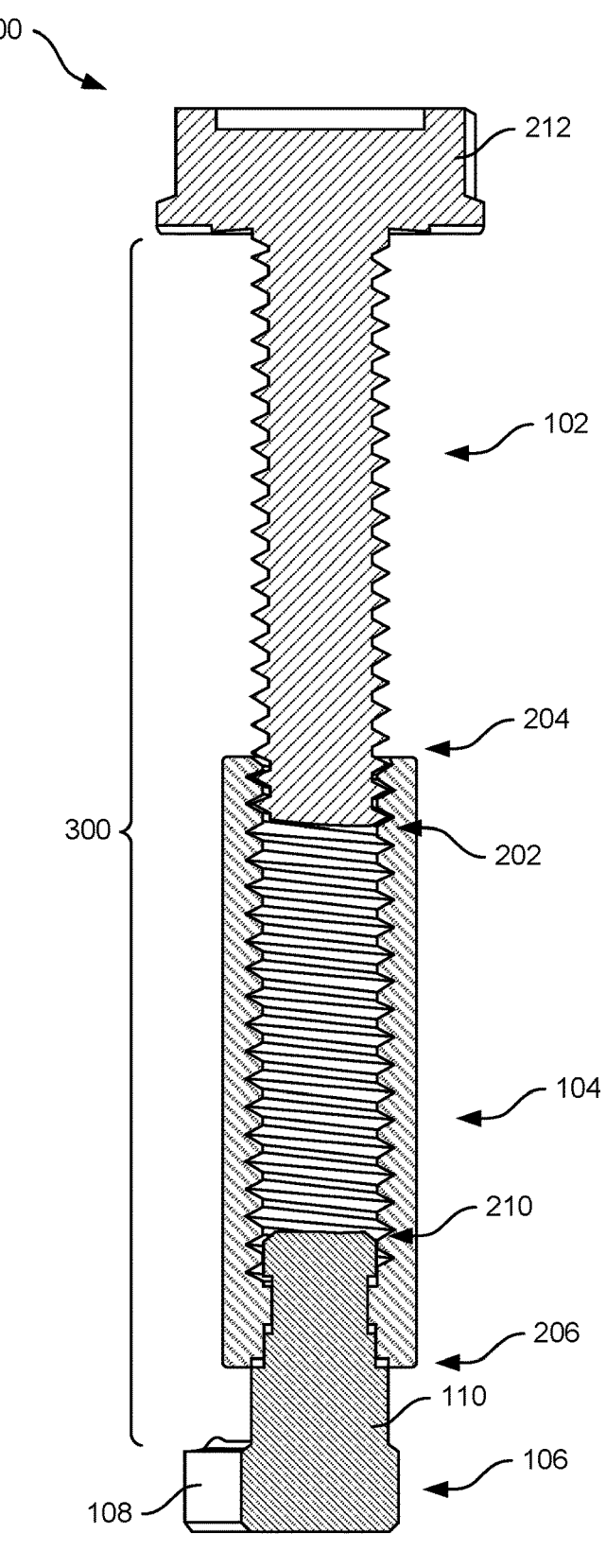
FIG. 3 illustrates a cross-section view of the clamping mechanism of FIG. 1, taken along line A-A of FIG. 1, according to embodiments of the present disclosure.

FIG. 3 illustrates a cross-sectional view of the clamping mechanism 100, taken along line A-A of FIG. 1, showing the first fastener 102, the second fastener 104, and the second fastener 104 engaged, according to examples of the present disclosure. As shown, the second end 202 of the first fastener 102 is received within the second fastener 104, at the first end 204, and the second end 210 of the third fastener 106 is received within the second fastener 104, at the second end 206. During a tightening of the third fastener 106, the third fastener 106 may extend into the second fastener 104 in order to clamp the photovoltaic module to the rail. For example, a distance 300 is defined between the first end 200 of the first fastener 102 (e.g., underneath side of the head 212) and the first end 208 of the third fastener 106 (e.g., underneath side of the head 212). As the first fastener 102 is rotated, the distance 300 may be adjusted, depending upon the direction of rotation.

In some embodiments, the second end 210 of the third fastener 106 is rotatably or fixedly secured within the second fastener 104. For example, the third fastener 106 may be rotated into the second end 206 of the second fastener 104, or may be pressed into the second end 206 of the second fastener 104 in order to seat the third fastener 106 within the second fastener.

Although a certain engagement (e.g., threaded) is shown between the first fastener 102, the second fastener 104, and the third fastener 106, respectively, other engagements are envisioned. Moreover, the engagement between the first fastener 102, the second fastener 104, and the third fastener 106 may form a conductive pathway in order to electrically bond the photovoltaic module to the rail. For example, the first fastener 102, the second fastener 104, and the third fastener 106 may be manufactured from steel, aluminum, etc. and the first fastener 102, the second fastener 104, and the third fastener 106 may be sufficiently engaged (e.g., in contact) in order to form a conductive pathway from the photovoltaic module to the rail.

Figure 4:
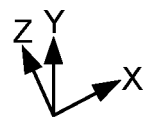
FIG. 4 illustrates a perspective view of the third fastener of FIG. 2, according to embodiments of the present disclosure.

FIG. 4 illustrates a perspective view of the third fastener 106, according to examples of the present disclosure. The third fastener 106 includes the head 108 and the body 110, which extends from the head 108, such as a first surface 400 of the head 108. The head 108 is disposed at the first end 208 of the third fastener 106, while the body 110 may extend to the second end 210. The body 110 may include a tang 402 that is received within the second fastener 104, and which couples the third fastener 106 to the second fastener 104. The body 110 may also include a hexagonal portion 404 that is received within a receptacle of the second fastener 104 at the second end 206. In some embodiments, the engagement between the tang 402 and/or the hexagonal portion 404 of the third fastener 106 with the second fastener 104 may prevent of the third fastener 106 relative to the second fastener 104.

The first ribs 112 and the second ribs 114 are shown being formed on, in, or by the first surface 400 of the head 108. When the head 108 is disposed within the rail, the first ribs 112 and the second ribs 114 are configured to engage with an interior surface of the rail. The first surface 400 of the head 108 may be opposite a second surface 406 of the head 108 that resides within the rail, but which may not engage with the interior surface. As shown, the third fastener 106 may include two of the first ribs 112, such as a first rib 112(1) and a second rib 112(2), and two of the second ribs 114, such as a first rib 114(1) and a second rib 114(2). As shown, the first ribs 112 may be disposed on a first side 408 of the body 110, and the second ribs 114 may be disposed on a second side 410 of the body 110. In other words, the body 110 may be disposed between the first ribs 112 and the second ribs 114. In some embodiments, the first ribs 112 may extend from the body 110 to a perimeter 412 of the head 108, at the first side 408, while the second ribs 114 may extend from the body 110 to the perimeter 412 of the head 108, at the second side 410.

In some embodiments, the first rib 112(1) may be the same as or different than the second rib 112(2). For example, the first rib 112(1) and the second rib 112(2) may include a similar shape. However, given the shape of the head 108 (e.g., parallelogram), the first rib 112(1) may be shorter in length (e.g., in the X-direction) than the second rib 112(2). Similarly, in some embodiments, the first rib 114(1) may be the same as or different than the second rib 114(2). For example, the first rib 114(1) and the second rib 114(2) may include a similar shape, however, the first rib 114(1) may be longer in length (e.g., in the X-direction) than the second rib 114(2). In some embodiments, the first rib 112(1) is the same as the second rib 114(2), and/or the second rib 112(2) is the same as the first rib 114(1).

The first ribs 112 and/or the second ribs 114 may include serrations that serve to deform (e.g., pierce, scrape, indent, etc.) the interior surface of the channel of the rail. Additional details of the serrations are discussed herein, however, the serrations may represent teeth-like features that penetrate through anodization of the rail to improve the electrical bonding between the clamping mechanism 100 and the rail. In some embodiments, the serrations are disposed on an end of the first ribs 112 and/or the second ribs 114, spaced apart from the body 110. For example, a first serration 414(1) and a second serration 414(2) may be disposed on an end of the first rib 112(1) and the second rib 112(2), respectively. As shown, the first serration 414(1) and the second serration 414(2) may be disposed on the end of the first rib 112(1) and the second rib 112(2), respectively, proximate to the perimeter 412 of the head 108 at the first side 408. Additionally, a first serration 416(1) and a second serration 416(2) may be disposed on an end of the first rib 114(1) and the second rib 114(2), respectively. The first serration 416(1) and the second serration 416(2) may be disposed on the end of the first rib 114(1) and the second rib 114(2), respectively, proximate to the perimeter 412 of the head 108 at the second side 410.

Figure 5A:
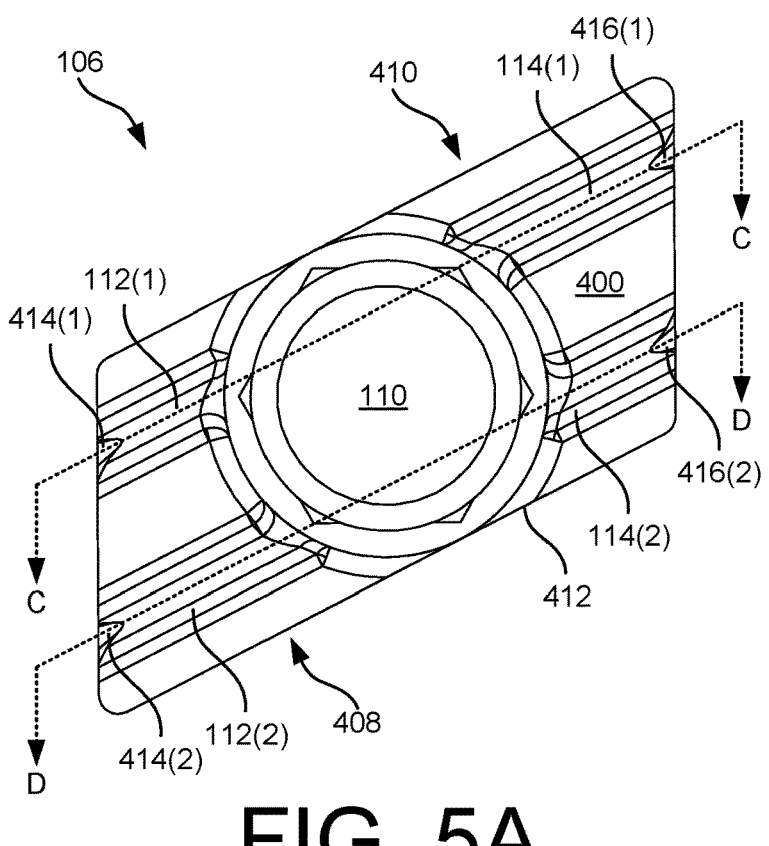
FIG. 5A illustrates a first side view of the third fastener of FIG. 2, according to embodiments of the present disclosure.
Figure 5A:
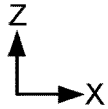
Figure 5B:
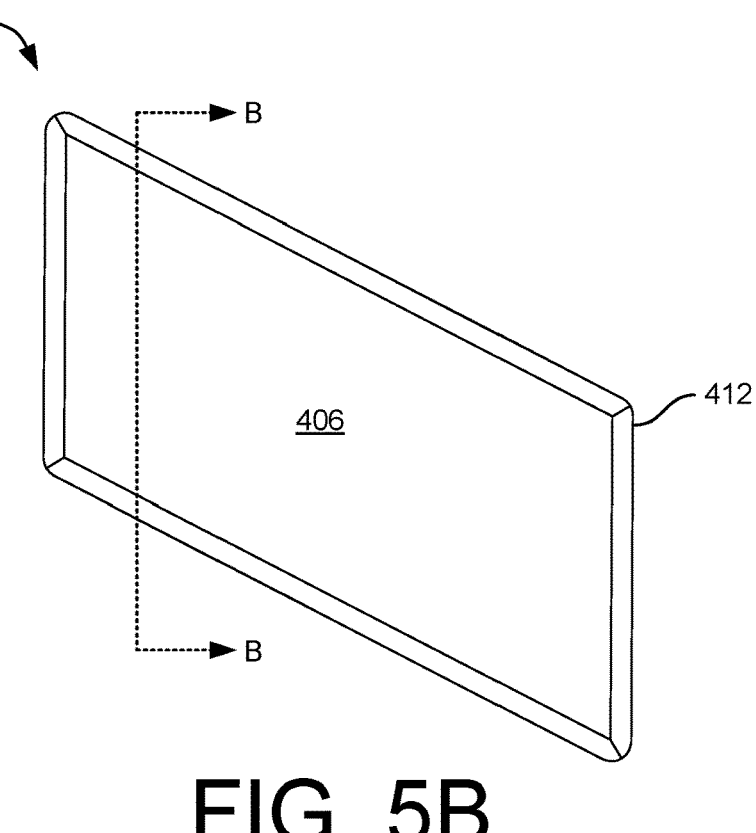
FIG. 5B illustrates a second side view of the third fastener of FIG. 2, according to embodiments of the present disclosure.
Figure 5B:
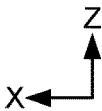

FIGS. 5A and 5B illustrate side views of the third fastener 106, according to examples of the present disclosure. FIG. 5A illustrates a top view of the third fastener 106, while FIG. 5B illustrates a bottom view of the third fastener 106. In some embodiments, the head 108 includes a parallelogram shape (e.g., about the X-Z plane) that rotates into engagement within the sidewalls of the channel during a tightening of the clamping mechanism 100.

The body 110 extends from the first surface 400 of the head 108, which is opposite the second surface 406 (e.g., in the Y-direction). The first ribs 112, such as the first rib 112(1) and the second rib 112(2) are disposed on the first surface 400, and extend in a lengthwise direction (e.g., X-direction) from the body 110 to the perimeter 412 at the first side 408. The second ribs 114, such as the first rib 114(1) and the second rib 114(2) are disposed on the first surface 400, and extend in a lengthwise direction (e.g., X-direction) from the body 110 to the perimeter 412 at the second side 410. As shown, the first rib 112(1) may be shorter in length as compared to the second rib 112(2), and/or the first rib 114(1) may be longer in length than the second rib 114(2). In some embodiments, the first rib 112(1) may be the same as the second rib 114(2), and/or the second rib 112(2) may be the same as the first rib 114(1).

The first rib 112(1) and the second rib 112(2) may be spaced apart from one another (e.g., in the Z-direction), and/or the first rib 114(1) and the second rib 114(2) may be spaced apart from one another (e.g., in the Z-direction). Although the third fastener 106 is described and shown as including two of the first ribs 112 and/or two of the second ribs 114, in some embodiments, more than two of the first ribs 112 and/or more than two of the second ribs 114 may be included. Additionally, while the first ribs 112 and the second ribs 114 are shown being in a substantially linear path (e.g., in the X-direction), the first ribs 112 and/or the second ribs 114 may include curved paths, zig-zag paths, and so forth.

At ends of the first ribs 112 and the second ribs 114 are the serrations. For example, the first serration 414(1) may be disposed on an end of the first rib 112(1), the second serration 414(2) may be disposed on an end of the second rib 112(2), the first serration 416(1) may be disposed on an end of the first rib 114(1), and the second serration 416(2) may be disposed on an end of the second rib 114(2).

In some embodiments, the first rib 112(1) may be parallel to the second rib 112(2), and/or the first rib 114(1) may be parallel to the second rib 114(2). Moreover, in some embodiments, the first rib 112(1) may be aligned (e.g., linear) with the first rib 114(1), and/or the second rib 112(2) may be aligned (e.g., linear) with the second rib 114(2).

Figures 6A, 6B:
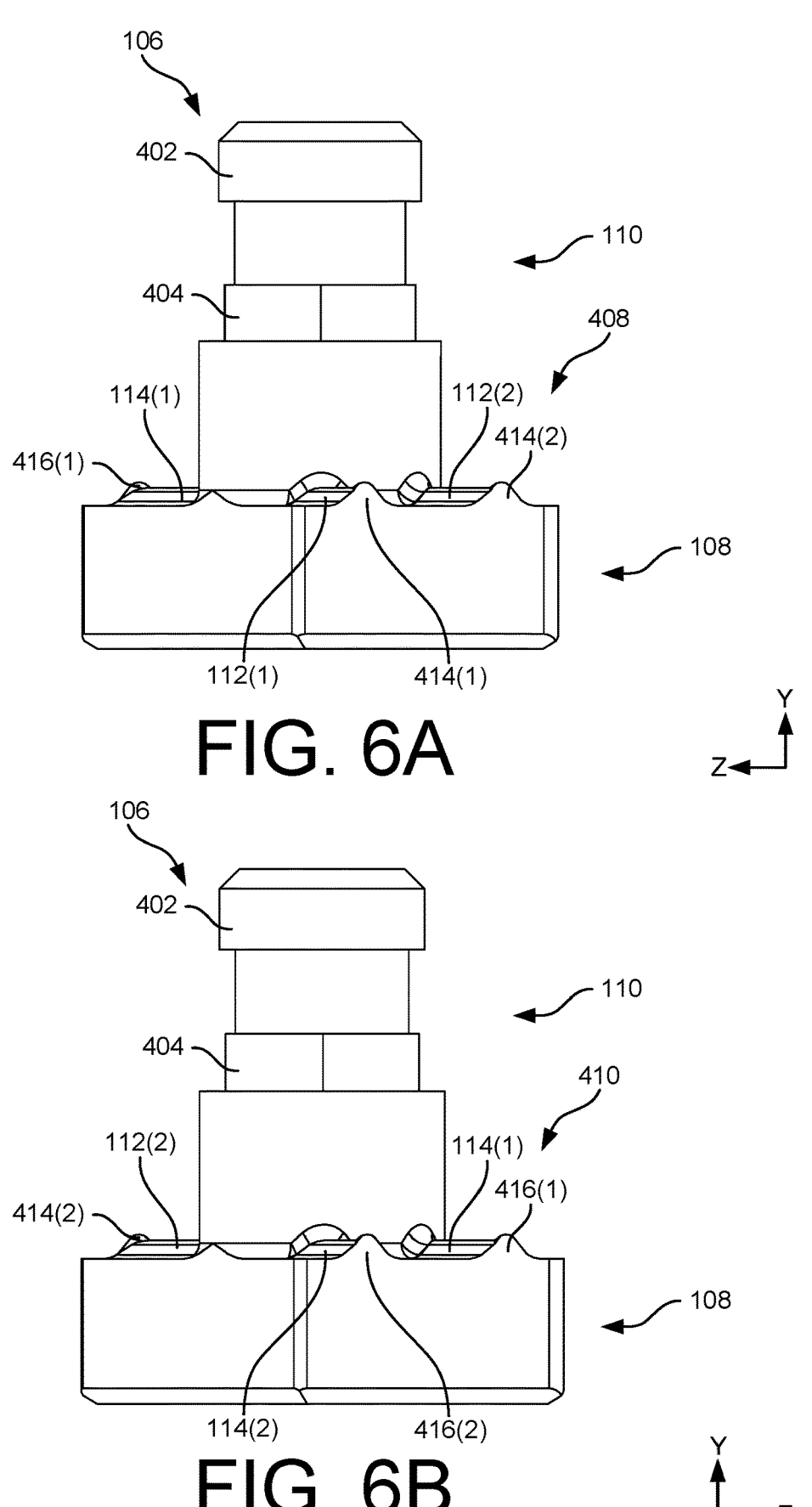
FIG. 6A illustrates a third side view of the third fastener of FIG. 2, according to embodiments of the present disclosure.
FIG. 6B illustrates a fourth side view of the third fastener of FIG. 2, according to embodiments of the present disclosure.

FIGS. 6A and 6B illustrate side views of the third fastener 106, such as the first side 408 and the second side 410, respectively, according to examples of the present disclosure. The head 108 is shown extending from the head 108, and includes the tang 402 and/or the hexagonal portion 404 for engaging with the second fastener 104. The first ribs 112 and the second ribs 114 extend from the first surface 400. As will be discussed herein, the first ribs 112 and/or the second ribs 114 may extend form the first surface 400 by a first height (e.g., in the Y-direction), while the first serrations 414 and the second serrations 416 may extend from the first surface 400 by a second height (e.g., in the Y-direction) that is greater than the first height. In doing so, the first serrations 414 and the second serrations 416 pierce anodization of the rail to electrically bond the clamping mechanism 100 to the rail.

Figure 7A:
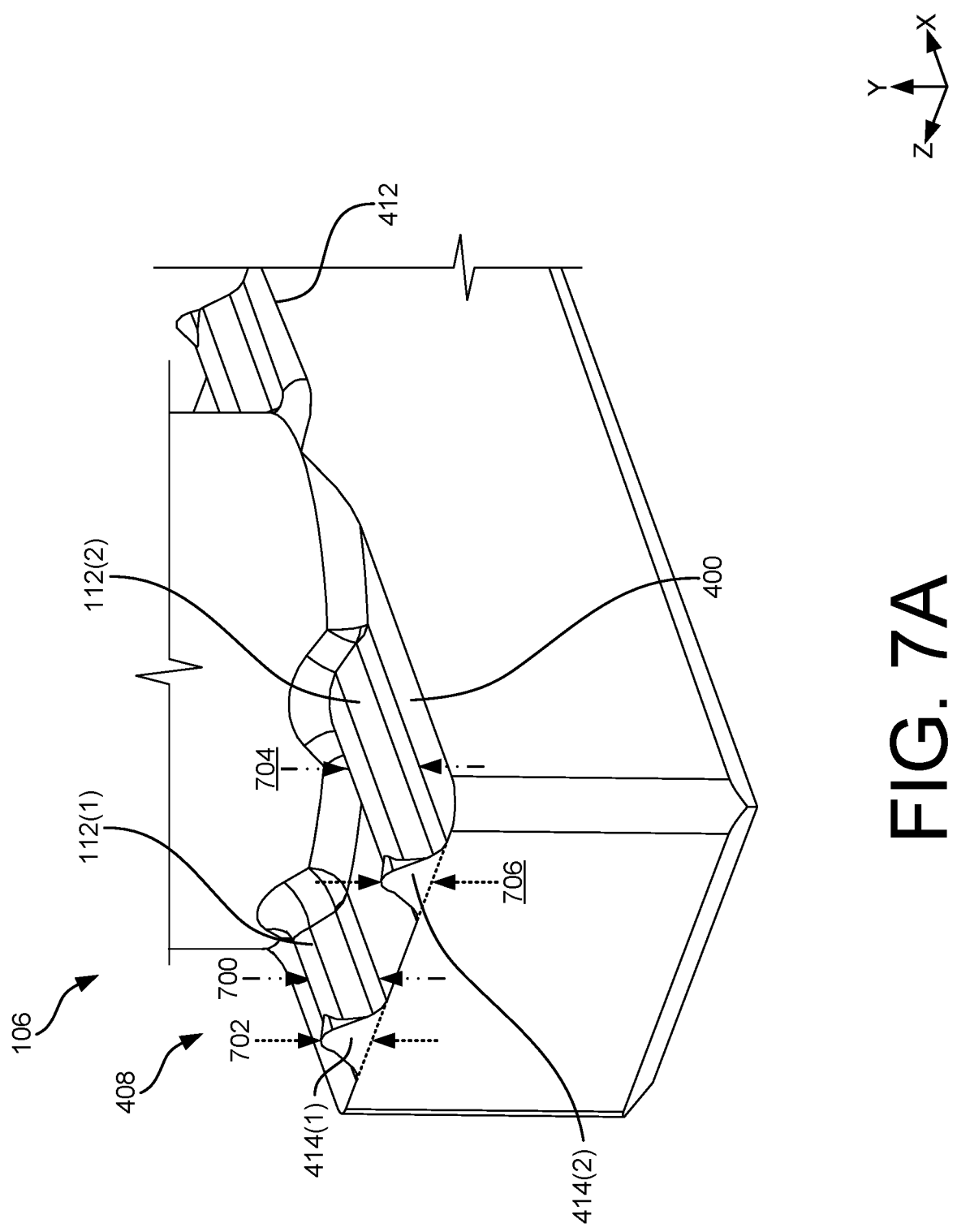
FIG. 7A illustrates a detailed view of example first ribs and first serrations of the third fastener of FIG. 2, according to embodiments of the present disclosure.
Figure 7B:
FIG. 7B illustrates a detailed view of example second ribs and second serrations of the third fastener of FIG. 2, according to embodiments of the present disclosure.

FIGS. 7A and 7B illustrate detailed views of the first ribs 112 and the second ribs 114, respectively, according to examples of the present disclosure.

In some embodiments, the first rib 112(1) includes a first height 700 between the first surface 400 and a top of the first rib 112(1). The first serration 414(1), which is disposed on an end of the first rib 112(1), includes a second height 702 between the first surface 400 and a top of the first serration 414(1). The second height 702 may be greater than the first height 700. In some embodiments, the first serration 414(1) curves, tapers, or otherwise extends from the first rib 112(1).

The second rib 112(2) includes a third height 704 between the first surface 400 and a top of the second rib 112(2). The second serration 414(2), which is disposed on an end of the second rib 112(2), includes a fourth height 706 between the first surface 400 and a top of the second serration 414(2). The fourth height 706 may be greater than the third height 704. In some embodiments, the second serration 414(2) curves, tapers, or otherwise extends from the second rib 112(2). In some embodiments, the first height 700 is the same as the third height 704, and/or the second height 702 is the same as the fourth height 706. However, in some embodiments, the first height 700 may be different than the third height 704, and/or the second height 702 may be different than the fourth height 706.

Similarly, in some embodiments, the first rib 114(1) includes a first height 708 between the first surface 400 and a top of the first rib 114(1). The first serration 416(1), which is disposed on an end of the first rib 114(1), includes a second height 710 between the first surface 400 and a top of the first serration 416(1). The second height 710 may be greater than the first height 708. In some embodiments, the first serration 416(1) curves, tapers, or otherwise extends from the first rib 114(1).

The second rib 114(2) includes a third height 712 between the first surface 400 and a top of the second rib 114(2). The second serration 416(2), which is disposed on an end of the second rib 114(2), includes a fourth height 714 between the first surface 400 and a top of the second serration 416(2). The fourth height 714 may be greater than the third height 712. In some embodiments, the second serration 416(2) curves, tapers, or otherwise extends from the second rib 114(2).

In some embodiments, the first height 708 is the same as the third height 712 (and/or the first height 700 and the third height 704, respectively), and/or the second height 710 is the same as the fourth height 714 (and/or the second height 702 and the fourth height 706, respectively). However, in some embodiments, the first height 708 may be different than the third height 712 (and/or the first height 700 and the third height 704, respectively), and/or the second height 710 may be different than the fourth height 714 (and/or the second height 702 and the fourth height 706, respectively).

Although the serrations are described as being separate features than the ribs, the serrations may be features that are integral with the ribs. For example, the serrations may represent a portion of the ribs, ribs, that includes a different height, shape, etc. than other portions of the ribs. More particularly, the first serration 414(1) may represent a portion of the first rib 112(1), the second serration 414(2) may represent a portion of the second rib 112(2), the first serration 416(1) may represent a portion of the first rib 114(1), and the second serration 416(2) may represent a portion of the second rib 114(2). In some embodiments, the serrations extend from, or are formed on, a top surface of the ribs, respectively. Here, the first rib 112(1) may include a first cross-sectional shape/dimension that excludes the first serration 414(1), and a second cross-sectional shape shape/ dimension that includes the first serration 414(1). Likewise, the second rib 112(2) may include a third cross-sectional shape/dimension that excludes the second serration 414(2), and a fourth cross-sectional shape shape/dimension that includes the second serration 414(2). The first cross-sectional shape may be different and/or similar to the second cross-sectional shape/dimension, and/or the third cross-sectional shape/dimension may be different and/or similar to fourth cross-sectional shape/dimension. The same may be true for the first rib 114(1), the second rib 114(2), the first serration 416(1), and the second serration 416(2), respectively.

Figure 8A:
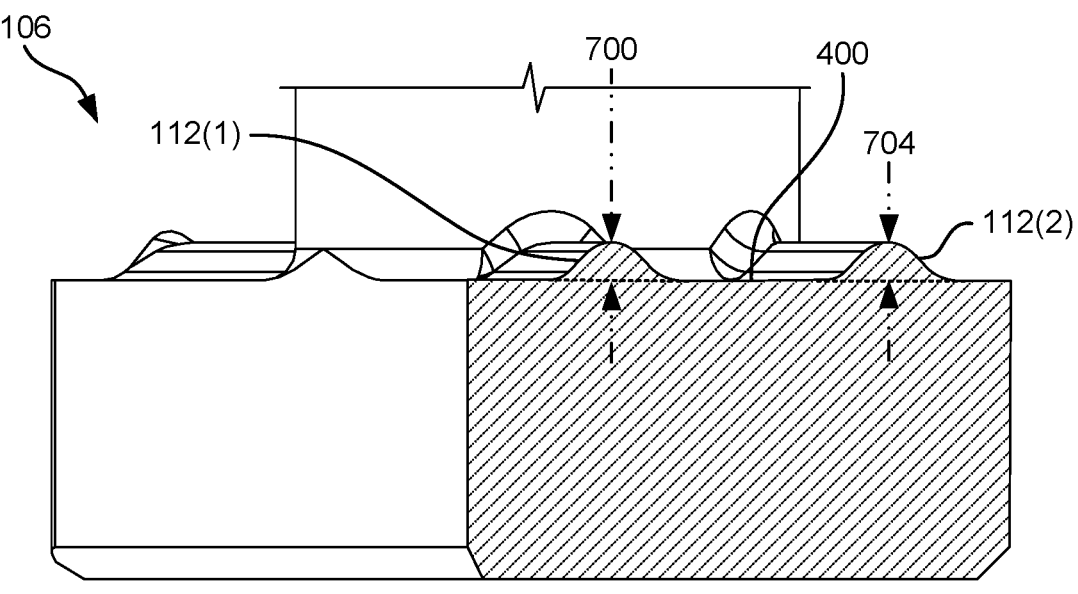
FIG. 8A illustrates a cross-sectional view of the third fastener of FIG. 2, taken along line B-B of FIG. 5B, showing details of the second ribs and the second serrations of FIG. 7B, according to embodiments of the present disclosure.
Figure 8A:
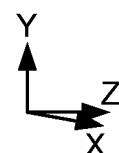
Figure 8B:
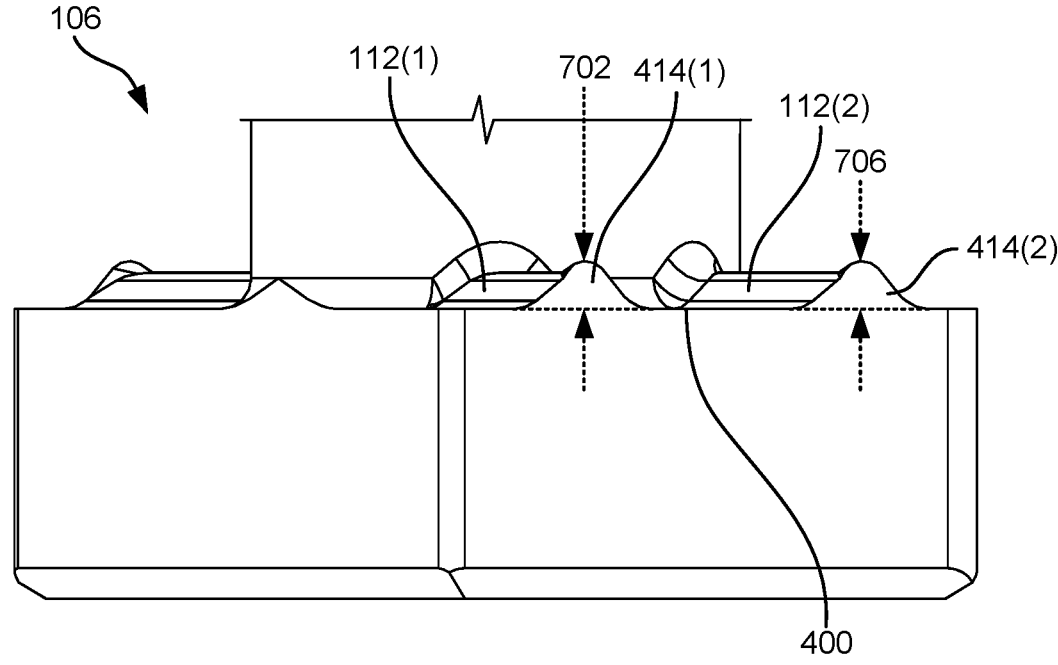
FIG. 8B illustrates a side view of the third fastener of FIG. 2, showing a detailed view of the second ribs and the second serrations of FIG. 7B, according to embodiments of the present disclosure.
Figure 8B:
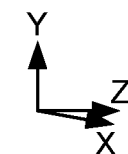

FIGS. 8A and 8B illustrate a comparison of heights of the ribs and the serrations, according to embodiments of the present disclosure. The discussion in FIGS. 8A and 8B relates to the first rib 112(1), the first serration 414(1), the second rib 112(2), and the second serration 414(2), however, the discussion herein may apply to first rib 114(1), the first serration 416(1), the second rib 114(2), and the second serration 416(2).

As introduced above, the first rib 112(1) may include the first height 700 and the first serration 414(1) may include the second height 702, which is greater than the first height 700. Additionally, the second rib 112(2) may include the third height 704 and the second serration 414(2) may include the fourth height 706, which is greater than the third height 704. The first height 700 and the third height 704 may represent a height of the first rib 112(1) and the second rib 112(2), respectively, while the second height 702 may represent a height of the first rib 112(1) and the first serration 414(1), and the fourth height 706 may represent a height of the second rib 112(2) and the second serration 414(2).

Figure 9A:
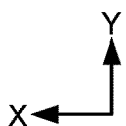
FIG. 9A illustrates a cross-sectional view of the third fastener of FIG. 2, taken along line C-C of FIG. 5A, according to embodiments of the present disclosure.
Figure 9B:
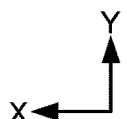
FIG. 9B illustrates a cross-sectional view of the third fastener of FIG. 2, taken along line D-D of FIG. 5A, according to embodiments of the present disclosure.

FIGS. 9A and 9B illustrate cross-sectional views of the third fastener 106, taken along line C-C of FIG. 5A and line D-D of FIG. 5A, respectively, according to embodiments of the present disclosure.

The first rib 112(1) may include a first length 900 (e.g., in the X-direction) that extends between the body 110 and the first serration 414(1). The first serration 414(1) may include a second length 902 (e.g., in the X-direction) that extends between the first rib 112(1) and the perimeter 412, at the first side 408 of the head 108. As shown, the first length 900 may be greater than the second length 902. In other words, the cross-sectional dimension shape/dimension of the first rib 112(1) may be longer in length as compared to the cross-sectional shape/dimension of the first serration 414(1). As such, a portion of the length of the first rib 112(1) including the first serration 414(1) may be shorter in length than a portion of the length of the first rib 112(1) corresponding to just the first rib 112(1).

The second rib 112(2) may include a third length 904 (e.g., in the X-direction) that extends between the body 110 and the second serration 414(2). The second serration 414(2) may include a fourth length 906 (e.g., in the X-direction) that extends between the second rib 112(2) and the perimeter 412, at the first side 408 of the head 108. As shown, the third length 904 may be greater than the fourth length 906. In other words, the cross-sectional dimension shape/dimension of the second rib 112(2) may be longer in length as compared to the cross-sectional shape/dimension of the second serration 414(2). As such, a portion of the length of the second rib 112(2) including the second serration 414(2) may be shorter in length than a portion of the length of the second rib 112(2) corresponding to just the second rib 112(2).

Moreover, in some embodiments, the first length 900 may be less than the third length 904 (e.g., the second rib 112(2) may be longer than the first rib 112(1)). Additionally, or alternatively, the second length 902 may be the same as or different than the fourth length 906 (e.g., the first serration 414(1) may include a length equal to the second serration 414(2)).

Similarly, the first rib 114(1) may include a first length 908 (e.g., in the X-direction) that extends between the body 110 and the first serration 416(1). The first serration 416(1) may include a second length 910 (e.g., in the X-direction) that extends between the first rib 114(1) and the perimeter 412, at the second side 410 of the head 108. As shown, the first length 908 may be greater than the second length 910. In other words, the cross-sectional dimension shape/dimension of the first rib 114(1) may be longer in length as compared to the cross-sectional shape/dimension of the first serration 416(1). As such, a portion of the length of the first rib 114(1) including the first serration 416(1) may be shorter in length than a portion of the length of the first rib 114(1) corresponding to just the first rib 114(1).

The second rib 114(2) may include a third length 912 (e.g., in the X-direction) that extends between the body 110 and the second serration 416(2). The second serration 416(2) may include a fourth length 914 (e.g., in the X-direction) that extends between the second rib 114(2) and the perimeter 412, at the second side 410 of the head 108. As shown, the third length 912 may be greater than the fourth length 914. In other words, the cross-sectional dimension shape/dimension of the second rib 114(2) may be longer in length as compared to the cross-sectional shape/dimension of the second serration 416(2). As such, a portion of the length of the second rib 114(2) including the second serration 416(2)

may be shorter in length than a portion of the length of the second rib 114(2) corresponding to just the second rib 114(2).

Moreover, in some embodiments, the first length 908 may be greater than the third length 912 (e.g., the second rib 114(2) may be shorter than the first rib 114(1)). Additionally, or alternatively, the second length 910 may be the same as or different than the fourth length 914 (e.g., the first serration 416(1) may include a length equal to the second serration 416(2)). Additionally, or alternatively, the first length 900 may be same or different than the third length 912, and/or the third length 904 may be the same or different than the first length 908. Additionally, in some embodiments, the second length 902 and the fourth length 906 may be the same as or different than the second length 910 and/or the fourth length 914, respectively.

Figure 10:
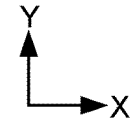
FIG. 10 illustrates an example use of the clamping mechanism of FIG. 1, according to embodiments of the present disclosure.

FIG. 10 illustrates an example use of the clamping mechanism 100 for clamping photovoltaic modules, such as a first photovoltaic module 1000 and a second photovoltaic module 1002, to a rail 1004, according to embodiments of the present disclosure. Additionally, in some embodiments, a bracket 1006 may be used to secure the first photovoltaic module 1000 and the second photovoltaic module 1002 to the rail 1004.

More particularly, the head 108 of the third fastener 106 is shown being disposed within a channel 1008 of the rail 1004. Although not shown, the rail 1004 may be coupled to a surface (e.g., roof, decking, etc.) to which the first photovoltaic module 1000 and the second photovoltaic module 1002 are mounted. The head 108 engages within the channel 1008 of the rail 1004 to provide an anchoring point against which the clamping mechanism 100 may be used to clamp the first photovoltaic module 1000 and the second photovoltaic module 1002. For example, as the first fastener 102 is tightened (e.g., treaded into the second fastener 104), the first fastener 102 may urge the bracket 1006 against the first photovoltaic module 1000 and the second photovoltaic module 1002, respectively, thereby clamping the first photovoltaic module 1000 and the second photovoltaic module 1002 to the rail 1004. In some embodiments, the first fastener 102 is disposed through a passage in the bracket 1006. Moreover, the bracket 1006 may slide over an exterior of the second fastener 104 as the first photovoltaic module 1000 and the second photovoltaic module 1002 are clamped to the rail 1004.

The clamping of the clamping mechanism 100, and the engagement with the first photovoltaic module 1000 and the second photovoltaic module 1002, electrically bonds the first photovoltaic module 1000 and the second photovoltaic module 1002 to the rail 1004. For example, being as the first fastener 102 is in contact with the bracket 1006, which is contact with the first photovoltaic module 1000 and the second photovoltaic module 1002, the clamping mechanism 100 may electrically bond to the rail 1004 (e.g., via an engagement between the head 108 (or the ribs and serrations))

Figure 11:
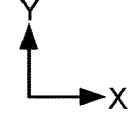
FIG. 11 illustrates an example use of the clamping mechanism of FIG. 1, according to embodiments of the present disclosure.

FIG. 11 illustrates an example use of the clamping mechanism 100 for clamping photovoltaic modules, such as a photovoltaic module 1100, to a rail 1102, according to embodiments of the present disclosure. Additionally, in some embodiments, a bracket 1104 may be used to secure the photovoltaic module 1100 to the rail 1102. In some embodiments, the photovoltaic module 1100 may be the same as the first photovoltaic module 1000 and/or the second photovoltaic module 1002, and/or the rail 1102 may be the same as the rail 1004.

However, the bracket 1104 may be different than the bracket 1006. For example, in some embodiments, the bracket 1104 may include a first portion 1106 and a second portion 1108. The first portion 1106 may be configured to extend from different lengths from the second portion 1108 (e.g., in the Y-direction). Such engagement may adjust a thickness of photovoltaic modules that the bracket 1104 is configured to clamp. In other respects, the clamping mechanism 100 may function similar to that as described above with regard to FIG. 10 to clamp the photovoltaic module 1100 to the rail 1102.

Figure 12:
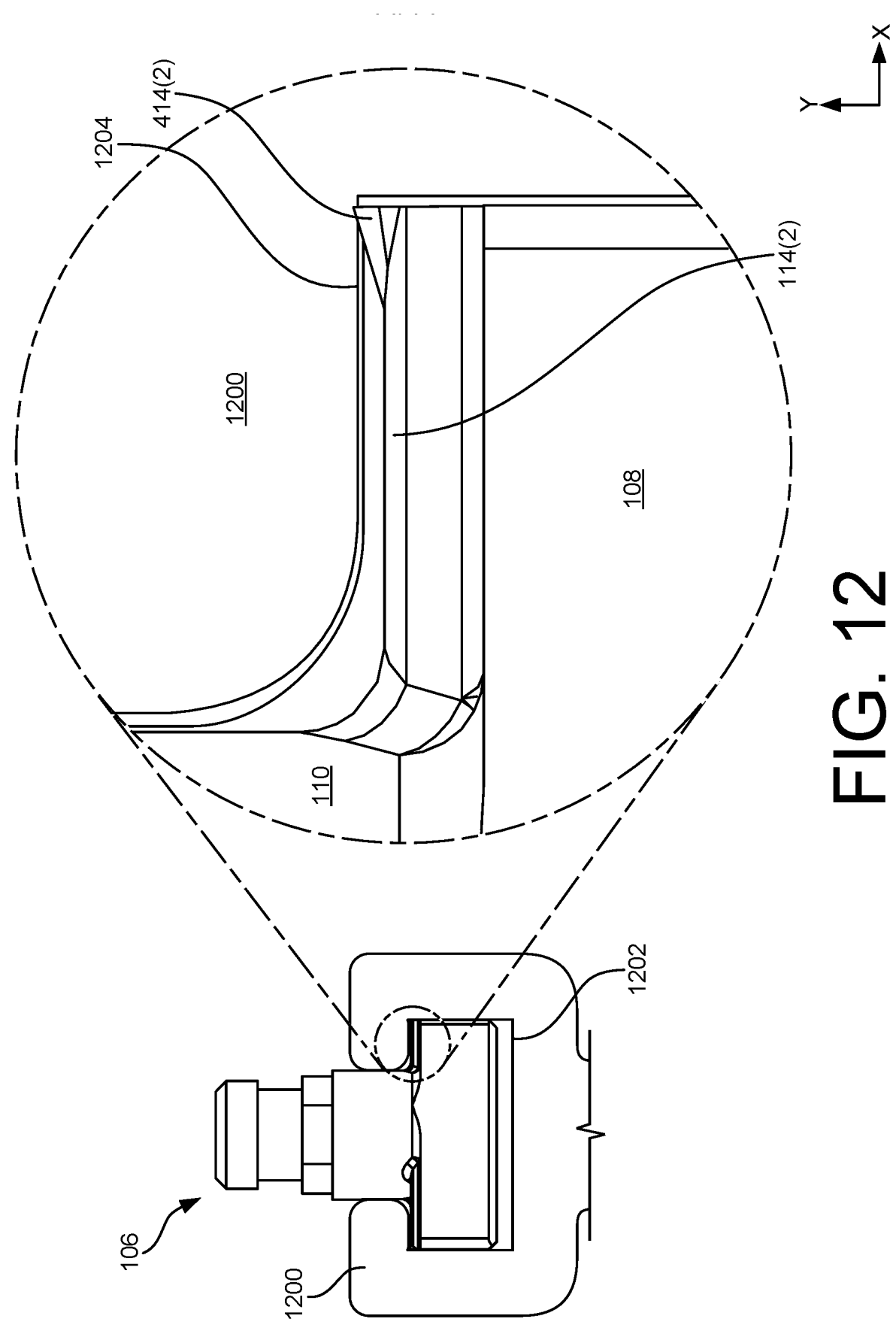
FIG. 12 illustrates an example use of the clamping mechanism of FIG. 1, according to embodiments of the present disclosure.

FIG. 12 illustrates an engagement between the third fastener 106 of the clamping mechanism 100 and a rail 1200, which may represent the rail 1004 and/or the rail 1102, according to embodiments of the present disclosure. The rail 1200 includes a channel 1202 that receives the head 108 of the third fastener 106, while the body 110 may extend external to the channel 1202 for engaging with the second fastener 104. In some embodiments, the third fastener 106 may be manipulated into the channel 1202 (e.g., to fit the head 108 into the channel 1202), and thereafter rotated such that the head 108 engages with the channel 1202 to provide an anchor point against which the clamping mechanism 100 is fastened.

The channel 1202 may include an interior surface 1204 that is engaged by the ribs and serrations. For example, the first rib 112(1), the second rib 112(2), the first serration 414(1), and the second serration 414(2) may engage with the interior surface 1204, on a first side of the channel 1202, while the first rib 114(1), the second rib 114(2), the first serration 416(1), and the second serration 416(2) may engage with the interior surface 1204, on a second side of the channel 1202 (e.g., shaped apart in the X-direction). Further during rotation of the third fastener 106 (e.g., during clamping), the serrations engage with the interior surface 1204. For example, in a detailed view, the second serration 414(2) is shown locally deforming a portion of the interior surface 1204 (e.g., score, scar, pierce, or penetrate), in order to electrically bond the clamping mechanism 100 to the rail 1200.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A clamping mechanism configured to clamp a photovoltaic module to a rail, the clamping mechanism comprising:
   a first fastener; and
   a second fastener including:
      a first end having a head configured to reside within a channel of the rail, the head including:
         a first rib extending in a length direction along an upper surface of the head and protruding above the upper surface to a first height along the length direction, a first serration disposed on the first rib at an outermost side edge of the first rib, the first serration extending upwardly away from a length direction of the first rib and toward the first fastener, such that:
   the first serration extends from the first height to a second height that is higher than the first height, and
   upon actuation of the clamping mechanism, the first serration engages with an inner surface of the rail;
a second rib,
a second serration disposed on the second rib,
a third rib,
a third serration disposed on the third rib,
a fourth rib, and
a fourth serration disposed on the fourth rib; and
a second end having a body coupled to the first fastener.

2. The clamping mechanism of claim 1, wherein:
the body extends from the head;
the first rib and the second rib are disposed on a first side of the body; and
the third rib and the fourth rib are disposed on a second side of the body.

3. The clamping mechanism of claim 1, wherein:
the first rib has a first length;
the first serration has a second length that is less than the first length;
the second rib has a third length;
the second serration has a fourth length that is less than the third length;
the third rib has a fifth length;
the third serration has a sixth length that is less than the fifth length;
the fourth rib has a seventh length; and
the fourth serration has an eighth length that is less than the seventh length.

4. The clamping mechanism of claim 1, wherein:
the second serration extends from the second rib;
the third serration extends from the third rib; and
the fourth serration extends from the fourth rib.

5. The clamping mechanism of claim 1, wherein at least one of the first serration, the second serration, the third serration, or the fourth serration is configured to pierce a dielectric layer of the rail.

6. The clamping mechanism of claim 1, wherein each of the first serration, the second serration, the third serration, or the fourth serration is located at a perimeter of the head, the perimeter extending around an outermost side edge of the head.

7. The clamping mechanism of claim 1, wherein:
the first rib is disposed from a surface of the head by a first distance;
the first serration is disposed from the surface by a second distance that is greater than the first distance;
the second rib is disposed from the surface by a third distance;
the second serration is disposed from the surface by a fourth distance that is greater than the third distance;
the third rib is disposed from the surface by a fifth distance;
the third serration is disposed from the surface by a sixth distance that is greater than the fifth distance;
the fourth rib is disposed from the surface by a seventh distance; and
the fourth serration is disposed from the surface by an eighth distance that is greater than the seventh distance.

8. A clamping mechanism comprising:

a first fastener including:

a head having:

a first rib with a first serration, the first rib extending a first length along an upper surface of the head and up to a first height, the first serration extending a second length that is less than the first length, and the first serration extending from the first rib, at an outermost side edge of the first rib, and to a second height that is greater than the first height of the first rib, a second rib with a second serration, the second rib extending a third length and the second serration extending a fourth length that is less than the third length, a third rib with a third serration, the third rib extending a fifth length and the third serration extending a sixth length that is less than the fifth length, and a fourth rib with a fourth serration, the fourth rib extending a seventh length and the fourth serration extending an eighth length that is less than the seventh length; and a body configured to couple to a second fastener, wherein, upon actuation of the clamping mechanism to clamp an object between the first fastener and the second fastener, the first serration engages with the object before the first rib.

9. The clamping mechanism of claim 8, further comprising:

the second fastener; and a third fastener, wherein:

the first fastener couples to a first end of the second fastener; and the third fastener couples to a second end of the second fastener, the second end being opposite the first end.

10. The clamping mechanism of claim 8, wherein:

the first length has a first cross-sectional shape;

the second length has a second cross-sectional shape that is different than the first cross-sectional shape;

the third length has a third cross-sectional shape;

the fourth length has a fourth cross-sectional shape that is different than the third cross-sectional shape;

the fifth length has a fifth cross-sectional shape;

the sixth length has a sixth cross-sectional shape that is different than the fifth cross-sectional shape;

the seventh length has a seventh cross-sectional shape; and the eighth length has an eighth cross-sectional shape that is different than the seventh cross-sectional shape.

11. The clamping mechanism of claim 10, wherein:

at least two of the first cross-sectional shape, the third cross-sectional shape, the fifth cross-sectional shape, and the seventh cross-sectional shape are identical; and at least two of the second cross-sectional shape, the fourth cross-sectional shape, the sixth cross-sectional shape, and the eighth cross-sectional shape are identical.

12. The clamping mechanism of claim 10, wherein at least one of:

the first length and the seventh length are identical;

the second length and the eighth length are identical;

the third length and the fifth length are identical; or the fourth length and the sixth length are identical.

13. The clamping mechanism of claim 8, wherein:

the first length is defined above a surface of the head by the first height;

the second length is defined above the surface by the second height that is greater than the first height;

the third length is defined above the surface by a third height;

the fourth length is defined above the surface by a fourth height that is greater than the third height;

the fifth length is defined above the surface by a fifth height;

the sixth length is defined above the surface by a sixth height that is greater than the fifth height;

the seventh length is defined above the surface by a seventh height; and the eighth length is defined above the surface by an eighth height that is greater than the seventh height.

14. The clamping mechanism of claim 8, wherein:

the first rib and the second rib are disposed on a first side of the body; and the third rib and the fourth rib are disposed on a second side of the body.

15. A clamping mechanism comprising:

a first fastener; and a second fastener attached to the first fastener, the second fastener comprising:

a body configured to couple the second fastener to the first fastener, and a head coupled to the body, the head including at least one rib disposed on the body, and at least one serration disposed on the at least one rib at an outermost side edge of the at least one rib, the at least one serration extending higher than a highest point of the at least one rib.

16. The clamping mechanism of claim 15, wherein:

the at least one rib comprises:

a first rib disposed on a first side of the body;

a second rib disposed on the first side of the body;

a third rib disposed on a second side of the body; and a fourth rib disposed on the second side of the body.

17. The clamping mechanism of claim 16, wherein:

the at least one serration comprises:

a first serration extending from the first rib;

a second serration extending from the second rib;

a third serration extending from the third rib; and a fourth serration extending from the fourth rib.

18. The clamping mechanism of claim 17, wherein:

the first rib has a first length;

the first serration has a second length that is less than the first length;

the second rib has a third length;

the second serration has a fourth length that is less than the third length;

the third rib has a fifth length;

the third serration has a sixth length that is less than the fifth length;

the fourth rib has a seventh length; and the fourth serration has an eighth length that is less than the seventh length.

19. The clamping mechanism of claim 17, wherein:

at least one of the first serration, the second serration, the third serration, or the fourth serration is configured to pierce a dielectric layer of a rail; and at least one of the first serration, the second serration, the third serration, or the fourth serration is located proximate to a perimeter of the head.

20. The clamping mechanism of claim 17, wherein:

the first rib is disposed from a surface of the head by a first distance;

the first serration is disposed from the surface by a second distance that is greater than the first distance;

the second rib is disposed from the surface by a third distance;

the second serration is disposed from the surface by a fourth distance that is greater than the third distance;

the third rib is disposed from the surface by a fifth distance;

the third serration is disposed from the surface by a sixth distance that is greater than the fifth distance;

the fourth rib is disposed from the surface by a seventh distance; and the fourth serration is disposed from the surface by an eighth distance that is greater than the seventh distance.

\* \* \* \* \*